United States Patent
Karalis et al.

(10) Patent No.: US 7,184,641 B2
(45) Date of Patent: Feb. 27, 2007

(54) SURFACE-PLASMON INDEX GUIDED (SPIG) WAVEGUIDES AND SURFACE-PLASMON EFFECTIVE INDEX GUIDED (SPEIG) WAVEGUIDES

(75) Inventors: Aristeidis Karalis, Cambridge, MA (US); David Chan, Cambridge, MA (US); Yoel Fink, Cambridge, MA (US); Kerwyn C. Huang, Princeton, NJ (US); Mihai Ibanescu, Cambridge, MA (US); John D. Joannopoulos, Belmont, MA (US); Elefterios Lidorikis, Arlington, MA (US); Evan Reed, Pine Island, MN (US); Marin Soljacic, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/123,424

(22) Filed: May 6, 2005

(65) Prior Publication Data
US 2005/0259936 A1 Nov. 24, 2005

Related U.S. Application Data

(60) Provisional application No. 60/569,414, filed on May 7, 2004.

(51) Int. Cl.
*G02B 6/10* (2006.01)
(52) U.S. Cl. ............... 385/129; 385/131; 385/122; 385/147
(58) Field of Classification Search .......... None
See application file for complete search history.

(56) References Cited

U.S. PATENT DOCUMENTS

| 6,782,179 | B2 * | 8/2004 | Bozhevolnyi et al. ...... 385/131 |
| 7,010,183 | B2 * | 3/2006 | Estes et al. .................. 385/14 |
| 2003/0133681 | A1 * | 7/2003 | Bozhevolnyi ............... 385/129 |
| 2003/0174384 | A1 | 9/2003 | Halas et al. |

OTHER PUBLICATIONS

Otto, A. "Excitation of Nonradiative Surface Plasma Waves in Silver by the Method of Frustrated Total Reflection," Atomic Nucleides, Berlin, DE, vol. 216 No. 4, 1968, pp. 398-410.

"Far-Infrared surface-plasmon quantum-cascade lasers at 21.5 μm and 24 μm wavelengths," Colombelli et al., *Applied Physics Letters*, v. 78, n. 18 (Apr. 30, 2001).

(Continued)

*Primary Examiner*—Michelle Connelly-Cushwa
*Assistant Examiner*—Omar Rojas
(74) *Attorney, Agent, or Firm*—Gauthier & Connors LLP

(57) ABSTRACT

A new class of surface plasmon waveguides is presented. The basis of these structures is the presence of surface plasmon modes, supported on the interfaces between the dielectric regions and the flat unpatterned surface of a bulk metallic substrate. The waveguides discussed here are promising to have significant applications in the field of nanophotonics by being able to simultaneously shrink length, time and energy scales, allowing for easy coupling over their entire bandwidth of operation, and exhibiting minimal absorption losses limited only by the intrinsic loss of the metallic substrate. These principles can be used for many frequency regimes (from GHz and lower, all the way to optical).

22 Claims, 3 Drawing Sheets

OTHER PUBLICATIONS

"Optical Near-Field Distributions of Surface Plasmon Waveguide Modes," Weeber et al., *Physical Review*, B 68, 115401 (2003).
"Surface Plasmons in Thin Films," Economou, *Physical Review*, v. 182, n. 2 (Jun. 10, 1969).
"Theory of Electron-Surface-Plamsons Interactions in Tunneling, Low-Energy-Electron Diffraction, and Photoemission," Ngai et al., *Physical Review*, v. 4, n. 7 (Oct. 1, 1971).
"Photoinduced Phase Transition in $VO_2$ Nanocrystals: Ultrafast Control of Surface-Plasmon Resonance," Rini et al., *Optics Letters*, v. 30, n. 5 (Mar. 1, 2005).
"High-Confinement Waveguides for Mid-IR Devices," Holdstrom, *Physica E*, pp. 40-43 (2000).
"Terahertz Quantum-Cascade Laser Operating up to 137 K," Williams et al., *Applied Physics Letters*, v. 83, n. 25 (Dec. 22, 2003).
"Active Plasmonics: Controlling signs in Au/Ga waveguide using nanoscale structural transformations," Krasavin et al., *Applied Physics Letters*, v. 84, n. 8 (Feb. 23, 2004).
"Optical Properties of Copper and Silver in the Energy range 2.5-9.0 eV" Stahrenberg et al., *Physical Review B*, v. 64, 113111 (2001).
"Long-Wavelength ($\lambda$=8-11.5µm) semiconductor lasers with waveguides based on surface plasmons," Sirtori et al., *Optics Letters*, v. 23, n. 17 (Sep. 1, 1998).
"Enhancement of Spontaneous Recombination Rate in a quantum ell by resonant surface Plasmo Coupiling" Neogi et al., *Physical Review B 66*, B 66, 153305 (2002).
"Coupling of InGaN quantum-well photoluminescence to silver surfase plat form," Gontijo et al. *Phsical Review*, v. 60, n. 16 Oct. 15, 2001).

* cited by examiner

SURFACE-PLASMON INDEX GUIDED (SPIG) WAVEGUIDES AND SURFACE-PLASMON EFFECTIVE INDEX GUIDED (SPEIG) WAVEGUIDES

PRIORITY INFORMATION

This application claims priority to U.S. Provisional Patent Application Ser. No. 60/569,414, filed May 7, 2004, which is incorporated herein by reference in its entirety.

This invention was made with government support under Grant No. DMR-02 13282 awarded by the NSF. The government has certain rights in the invention.

BACKGROUND OF THE INVENTION

1. Field of Invention

The present invention relates generally to the field of waveguides. More specifically, the present invention is related to guidance mechanisms for waveguiding of Surface Plasmons.

2. Discussion of Prior Art

Guiding light through air has always been a challenging goal in the world of optics, and special techniques have always been necessary to achieve it, since in the presence of dielectric media light tends to localize itself mostly in the high-refractive-index regions. For all-dielectric structures, a photonic bandgap (as described by Joannopoulos et al. in the publication titled "Photonic Crystals: Molding the Flow of Light") is the only mechanism that can rigorously succeed in guiding most of the field in the low-index medium, since other demonstrated methods based on index guiding (such as the method described in the paper to Xu et al. titled "Experimental Demonstration of Guiding and Confining Light in Nanometer-Size Low-Refractive-Index Material") work only provided that the high-index regions do not extend to infinity.

Including conducting materials, one can also explore surface-plasmon modes (as described in the publication to Raether titled "Surface Plasmons") to guide light. Since for these modes the field stays attached to the surface of the conductor, the most common method employed so far to create transversely localized guided modes has been to close this surface onto itself, namely by using a conductor with a finite cross-section (as described in: (1) the paper to Takahara et al. titled "Guiding of a One-Dimensional Optical Beam With Nanometer Diameter"; (2) the paper to Berini et al. titled "Plasmon-Polariton Waves Guided by a Metal Film of Finite Width by Different Dielectrics"; (3) the paper to Weeber et al. titled "Optical Near-Field Distributions of Surface Plasmon Waveguide Modes"; (4) the paper to Nikolajsen et al. titled "Polymer-Based Surface-Plasmon-Polariton Stripe Waveguides at Telecommunication Wavelengths"; and (5) the paper to Hochberg et al. titled "Integrated Plasmon and Dielectric Waveguides"). Other suggestions have been to combine surface plasmons with bandgaps by corrugation of the metal for confinement in different directions (as described in the paper to Bozhevolnyi et al. titled "Waveguiding in Surface Plasmon Polariton Band Gap Structures") or to use coupled-metallic-nanoparticle chains as plasmon waveguides (as described in the paper to Maier et al. titled "Local Detection of Electromagnetic Energy Transport Below the Diffraction Limit in Metal Nanoparticle Plasmon Waveguides").

Whatever the precise merits, features, and advantages of the above mentioned techniques, none of them achieves or fulfills the purposes of the present invention.

SUMMARY OF THE INVENTION

The present invention provides for an apparatus comprising a substrate of plasmonic material, and a dielectric waveguide disposed vertically on top of the flat (unpatterned) surface of the plasmonic material. All the waveguiding properties are achieved by modulating only the properties of the dielectric in the directions transverse to the waveguiding direction. Since the surface of the plasmonic material is flat, in the case when the plasmonic material is a metal, the propagation losses are limited only by the intrinsic material losses of the (bulk) metal.

In one embodiment, the apparatus of the present invention comprises: (a) a flat unpatterned substrate of plasmonic material; and (b) a distribution of dielectric disposed on top of the flat unpatterned substrate of plasmonic material forming a waveguide, whereby lowering temperature of said flat unpatterned substrate limits absorption losses to intrinsic losses.

In another embodiment, the apparatus of the present invention comprises: (a) a flat unpatterned substrate of plasmonic material; and (b) a distribution of dielectric disposed on top of said flat unpatterned substrate of plasmonic material forming a waveguide, wherein a plurality of guided surface plasmon modes exist for a specific frequency regime, with the surface plasmon modes being supported on the interface between said dielectric regions. In this embodiment, the plasmonic material and the surface plasmon modes existent in the different dielectric regions have different dispersion relations allowing frequency bands, where a surface plasmon in the central waveguiding region, due to its large wavevector, couples only to evanescent surface plasmon modes outside of the waveguide, and is thereby being guided. Such waveguides employing the described total-internal-reflection-based mechanism are referred to as Surface-Plasmon Index Guided (SPIG) waveguides.

In another embodiment, the apparatus of the present invention comprises: (a) a flat unpatterned substrate of plasmonic material; and (b) a distribution of dielectric disposed on top of said flat unpatterned substrate of plasmonic material forming a waveguide, wherein a plurality of guided surface plasmon modes existing for a specific frequency regime, with the surface plasmon modes being supported on the interface between said dielectric regions. In this embodiment, the surface plasmon modes existent in the different dielectric regions have different frequency cutoffs allowing frequency bands where a surface plasmon in a central waveguiding region has a frequency which is above the frequency cutoff for the surface plasmon modes in the regions outside of the waveguide, whereby surface plasmons in the central region have no surface plasmons to which it can couple to, and is thereby being guided. Such waveguides employing the described surface-plasmon-cutoff-based mechanism are referred to as Surface-Plasmon Effective Index Guided (SPEIG) waveguides.

When the dielectric structure is layered (layers parallel to the surface of the plasmonic substrate), the waveguides can be designed to support modes (over very large frequency bandwidths) of very large wavevectors (much larger than the wavevectors of the same frequency would be in air), and very low group velocity (and low group velocity dispersion). These features cannot (all at the same time) be attained in all-dielectric structures, and are very attractive in the field of nanophotonics, since they enable significant reduction in all (spatial, temporal, and operational energy) device scales.

According to the teachings of the present invention, ease of integration in terms of broadband coupling is also accomplished.

Further, the waveguides of the present invention (with appropriate material choices) can be used for many frequency regimes (from GHz and lower, all the way up to optical).

DESCRIPTION OF THE PREFERRED EMBODIMENTS

Figure 1:
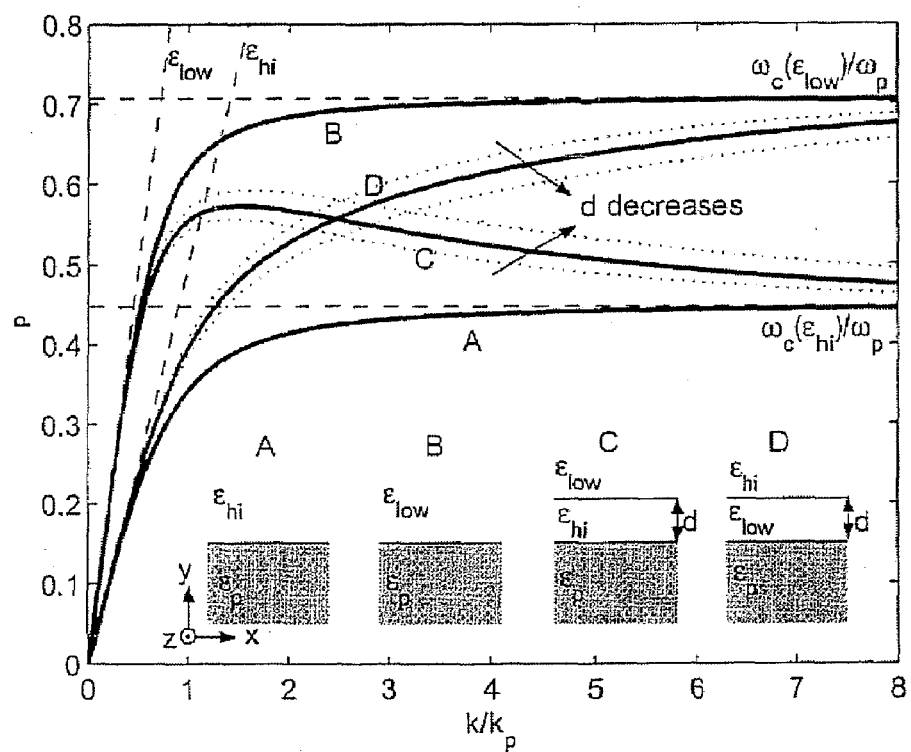
FIG. 1 illustrates ω-k diagrams (solid curves) for conventional layered Surface Plasmon structures (insets A–D) with $\omega_{hi}=4$ and $\omega_{low}=1$ (air).

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Surface Plasmons (SP) are electromagnetic waves, which can propagate bound along the interface between a dielectric material of permittivity $\epsilon$ and a metal with dispersive permittivity $\epsilon_p(\omega)=1-\omega_p^2/\omega^2$ where $\omega_p$ is the plasma frequency of collective oscillations of the free conduction electrons. Condition for the existence of a SP (satisfaction of the boundary conditions) is that the magnetic field is polarized parallel to the interface (TM polarization) and that $\epsilon_p(\omega)<-\epsilon<0$, therefore such a mode exhibits a high frequency cutoff at $\omega_c(\epsilon)=\epsilon_p/\sqrt{1+\epsilon}$. For low frequencies, the field decays fast into the plasma medium (since $\epsilon_p(\omega\to 0)\to-\infty$) but extends a lot into the dielectric, so the ω-k relation of the plasmon mode simply follows the light line of the dielectric. The confinement to the surface increases with frequency, since k increases quickly with ω, approaching infinity just below $\omega_c$, and thus leading to a tightly bound mode with very small group velocity.

The above properties can be summarized in the guidance condition $$k = \frac{\omega}{c}\sqrt{\frac{\varepsilon \cdot \varepsilon_p(\omega)}{\varepsilon + \varepsilon_p(\omega)}} \quad (1)$$

FIG. 1 illustrates ω-k diagrams (solid curves) for conventional layered Surface Plasmon structures (insets A–D) with $\epsilon_{hi}=4$ and $\epsilon_{low}=1$ (air). Layer thicknesses $d/\lambda_p=0.015$, 0.02, and 0.025 are used for C and D (solid+dotted curves). The light lines $\omega/\omega_p=\sqrt{\epsilon}\cdot k/k_p$, ("vertical" dashed lines) and the cutoff frequencies $\omega_c(\epsilon)/\omega_p=1/\sqrt{1+\epsilon}$ (horizontal dashed lines) are shown. Further, the guidance condition above is shown in curves A and B in FIG. 1 for two different dielectric materials ($\epsilon_{hi}>\epsilon_{low}$) over the plasma (insets A and B).

Several extensions of this simple structure in the form of planar layers have been examined in the past (as in the paper to Economou titled "Surface Plasmons in Thin Films" and the paper to Burke et al. titled "Surface-Polariton-Like Guided by Thin, Lossy Metal Film"). In one scenario, a layer of thickness d of a higher dielectric $\epsilon_{hi}$ (FIG. 1, inset C) is inserted between the dielectric $\epsilon=\epsilon_{low}$ and the plasmonic material. The behavior of the ω-k guidance condition is now determined by the implicit equation:

$$\tanh(u_{hi}\varepsilon_{hi}d) = -\frac{1+u_p/u_{low}}{u_{hi}/u_{low}+u_p/u_{hi}}, \quad (2)$$

where $u_{hi}=\epsilon_{hi}^{-1}\sqrt{k^2-\omega^2/c^2\cdot\epsilon_{hi}}$ (and similarly for $u_{low}$ and $u_p$), and which reduces to 1 for $\epsilon_{hi}=\epsilon_{low}=\epsilon$. The curve C in FIG. 1 can be easily explained using similar arguments as before: for low frequencies, the mode has most of its energy stored in the outer dielectric $\epsilon_{low}$, so it follows the behavior of a SP in $\epsilon_{low}$ (curve B); in the other limit of large k values, the field is tightly bound to the plasma $\epsilon_{hi}$ interface, so it doesn't "see" much of the outside material, and thus the guidance condition must asymptote to that of a SP in $\epsilon_{hi}$ (curve A). The smaller the thickness d, the higher the frequency ω (and the wavenumber k) where this change in behavior happens and this dependence on d is depicted in FIG. 1 with dotted curves. It can be seen that, for small enough thicknesses, the mode exhibits a regime of negative group velocity.

Similarly, in the case of interest, where the two dielectric materials are interchanged (inset D), there still exists a vertically confined surface wave (namely one that does not leak power through radiation from the low-into the high-index space), since Eq. (2) with $\epsilon_{hi}\leftrightarrows\epsilon_{low}$ has a solution, which lies below the $\epsilon_{hi}$ light line. Curve D has now opposite asymptotic behavior from C in the two limits of low ω and high k values, so the group velocity of this mode is always positive.

A significant remark for both cases is that decreasing the layer thickness down to few atomic layers can lead to arbitrarily small group velocity (negative or positive respectively) over the entire huge bandwidth [ω($\epsilon_{hi}$), ω($\epsilon_{low}$)], and actually with small group velocity dispersion (GVD). This is a unique physical property for layered plasmonic systems (as in the paper to Economou titled "Surface Plasmons in Thin Films"), since any other known system that can support very low group velocities (such as electromagnetically induced transparency or a photonic crystal waveguide) does so only within a narrow frequency band.

Figure 2A:
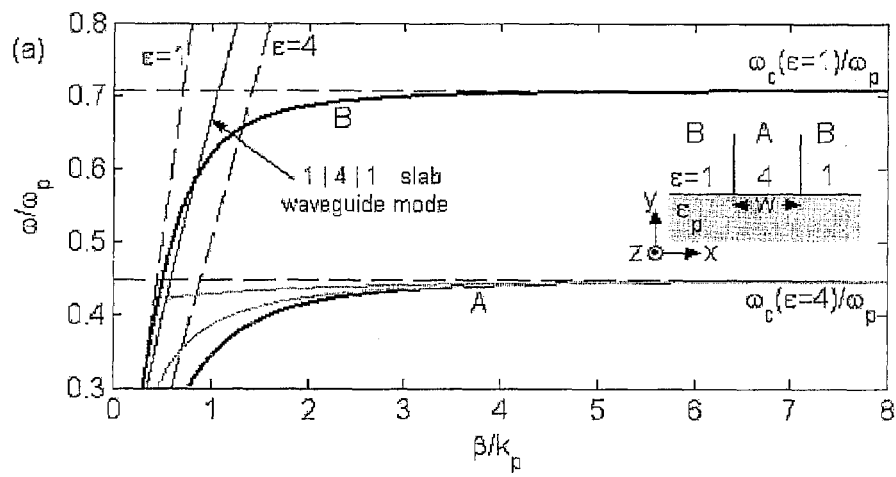
FIGS. 2a–b depict ω-k diagrams (grey curves calculated via the effective-index method) for SPIG waveguide structures (in-sets) with $\omega/\lambda_p=0.25$ and $d/\lambda_p=0.02$.
Figure 2B:
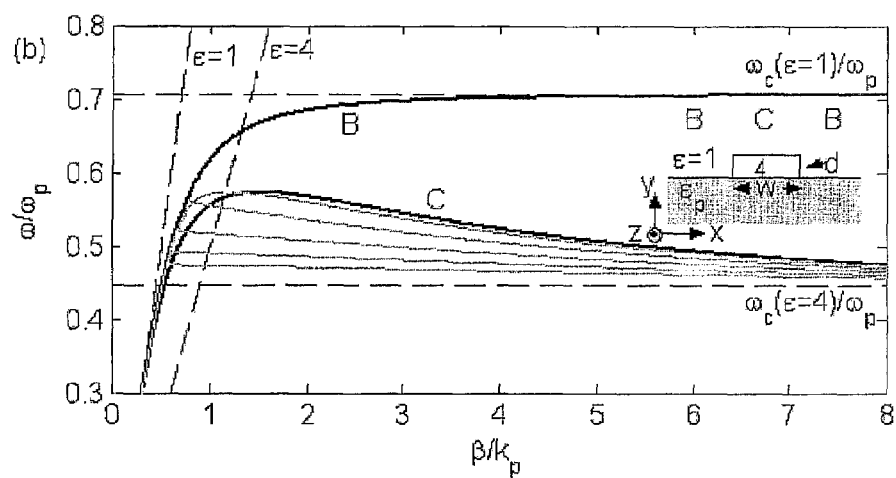

All of the above Surface Plasmons are vertically (along y) confined, but infinitely extended in the x-z plane of propagation. It is beneficial to design structures which can support modes that are guided along z but are also confined in the lateral x direction, without using a photonic bandgap or a finite-sized conductor, as already mentioned. FIGS. 2a–b depict ω-k diagrams (grey curves calculated via the effective-index method) for SPIG waveguide structures (in-sets) with $\omega/\lambda_p=0.25$ and $d/\lambda_p=0.02$. The SP modes A–D (from FIG. 1) of the individual vertical slices (thick solid black curves) and the slab waveguide mode of a horizontal slice (thin solid black curve) limit the regions where fully confined modes can exist. The simplest scenario for the x-y cross-section of such a waveguide is that of a vertical slab of infinite height, width w and permittivity $\epsilon_{hi}$, placed on top of the semi-infinite space of conducting medium, and surrounded by a lower-index medium $\epsilon_{low}$, as shown in the inset of FIG. 2a. If the cross-section is divided in three vertical slices, then the central slice has an average permittivity higher than that of the exterior slices. Thus, light confinement in x is possible, by invoking the common index-guiding mechanism: the central slice, if examined individually being uniform in x-z, supports the SP A from FIG. 1, which lies below all the modes supported by the outer slices alone, namely curve B and the $\epsilon_{low}$ light line ($k_A > k_B > \omega/c.\epsilon_{low}$); therefore, if the SP A travels in-side the $\epsilon_{hi}$ slab at a small angle with the z axis (namely with a large $k_z = \beta$ component of its total wavevector $k_A$), when it hits the $\epsilon_{low}$ boundary, it will couple only to decaying modes in x, in order to preserve β phase-matching along z and since their total momentum is less than β (e.g., $k_{x,B}^2 = k_B^2 - \beta^2 < 0$); therefore the field will be confined is x. If the conserved wavenumber β of the total field pattern is also larger than that of the mode supported by the $\epsilon_{low}$-$\epsilon_{hi}$-$\epsilon_{low}$ slab waveguide formed vertically on top of the substrate, then the field will couple only to decaying modes in y too. Therefore in total, fully transversely confined guided modes can exist for this structure, which is referred to as a Surface-Plasmon Index-Guiding (SPIG) waveguide.

The wavenumber β of a guided mode cannot have any arbitrary value, but must be such that a resonance condition in the x-y cross-section is satisfied. A simple method to quickly estimate this condition and its solutions for the propagation constants $\beta_n$ is the effective index method (as described in the publication to Marcuse titled "Theory of Dielectric Optical Waveguides"): each $i^{th}$ vertical slice is replaced by a homogeneous layer of refractive index equal to the effective index ($n_{eff,i} = k_i/(\omega/c)$) of the lowest order mode ($k_i$, $\phi_i(y)$) supported within this slice; the complicated cross-section of the waveguide thus gets reduced into a simpler but approximately equivalent layered structure, whose modes can be easily found, making sure that the most appropriate polarization of the fields is used. The method is most accurate, when the transverse profiles $\phi_i(y)$ of these lowest order modes are nearly the same, so that the couplings to higher order modes can be safely ignored. To implement the method for the structure of FIG. 2a, the effective indices of the SPs A and B should be used respectively for the central and outer layers of the resulting symmetric slab waveguide, while the E-field is chosen to be polarized along y, since A and B are TM polarized with the H-field in the x-z plane. The resulting dispersion curves are shown in FIG. 2a. An infinite number of modes is found just below the $\omega = \omega_c(\epsilon_{hi})$ cut-off line, since in that frequency region $k \rightarrow \infty$ for curve A, so the effective slab waveguide is one with an infinite index-contrast, which indeed supports an infinite number of modes inside its core.

The case in which the central high-permittivity slab has a finite height d is shown as an inset in FIG. 2b and can be treated similarly. The average refractive index at the center is higher that on the sides, so lateral confinement of the field is again attainable. The only difference here is that the inner slice alone supports the SP C from FIG. 1, which still lies below the SP B, the lowest order mode supported by the sides. Vertical confinement is also guaranteed, since the $\epsilon_{low}$ light line characterizing radiation into the top cladding is above B anyway. Therefore, for a fixed frequency ω, the guided modes will have wavenumbers β between the curves C and B, since only in this regime the field is composed only by decaying modes in the outer regions. The effective index method can be again employed, yielding the results shown in FIG. 2b. There is an infinite number of modes as the cutoff frequency $\omega_c(\epsilon_{hi})$ is approached, this time from above if d is small enough, in which case these modes have negative group velocity.

Figure 3A:
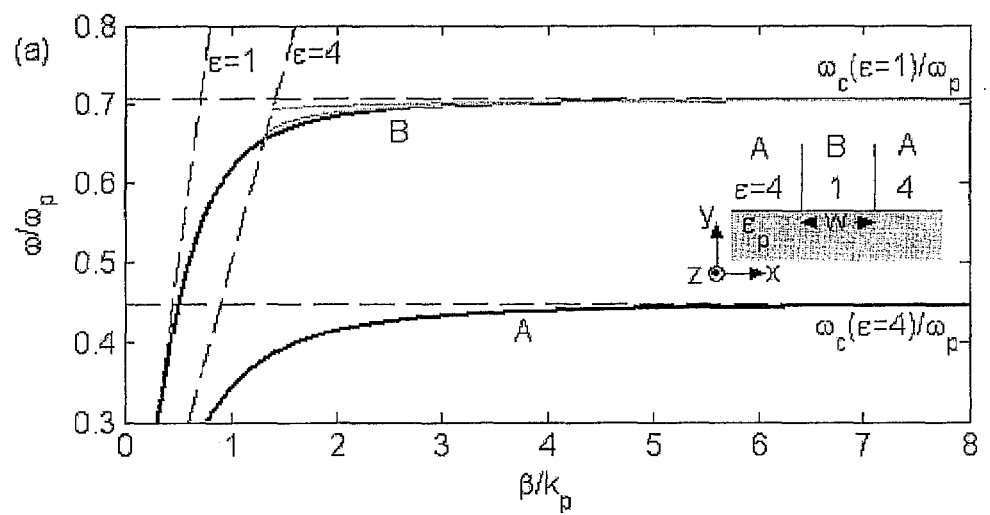
FIGS. 3a–b depict ω-β diagrams for SPEIG waveguide structures (insets) with $\omega/\lambda_p=0.25$ and $d/\lambda_p=0.02$.
Figure 3B:
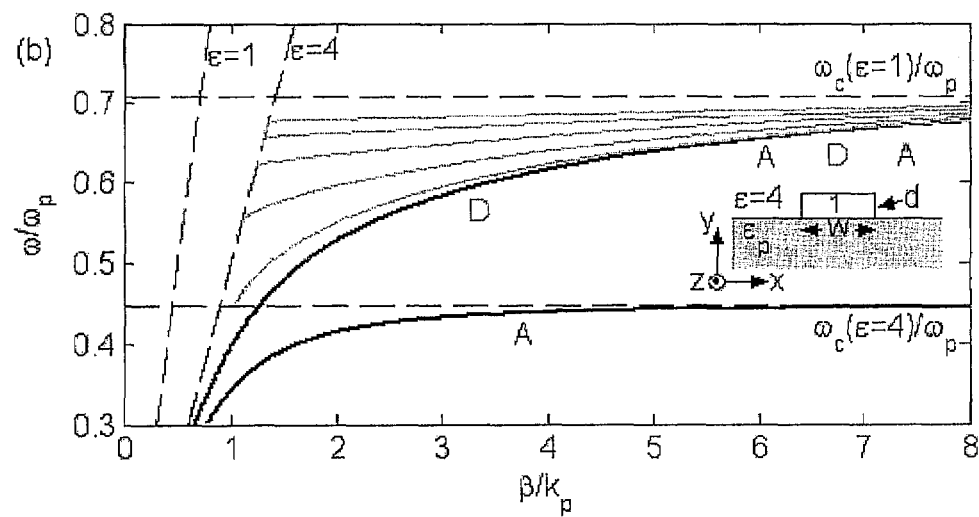

Let us now examine what happens, if the values of the dielectrics were interchanged for the structures presented in FIG. 2, leading to those in insets of FIGS. 3a and 3b. FIGS. 3a–b depict ω-β diagrams for SPEIG waveguide structures (insets) with $\omega/\lambda_p = 0.25$ and $d/\lambda_p = 0.02$. In both cases the average permittivity of the central vertical slice is lower than that of the outer ones, so our index-guiding intuition would now imply that no guiding is possible. Indeed, the SPs B or D (for FIGS. 3a and 3b respectively), that can propagate along the central low-average-index slice, lie in the ω-β plane above the SP A, supported by the high-index side claddings. Therefore, when B or D couple to A on the $\epsilon_{hi}$ boundary, A has to radiate outwards in x, excluding the possibility for existence of confined guided modes. However, this coupling can only happen, when the SP A does actually exist, and this holds only for frequencies below $\omega_c(\epsilon_{hi})$. Above this cutoff, the SP mode A of the outer slices disappears, and the lowest order mode that can lead to radiation laterally or vertically becomes just the first mode within the continuum described by the $\epsilon_{hi}$ light line. This line now lies above the SPs B and D, that are still present up to $\omega_c(\epsilon_{low})$, thus in the [$\omega_c(\epsilon_{hi})$, $\omega_c(\epsilon_{low})$] frequency range fully transversely confined guided modes can exist, with propagation constants β between the $\epsilon_{hi}$ light line and B or D, and with a significant part of the energy stored inside the low-index core. The effective index method indicates how the dispersion of these modes should approximately look like (FIG. 3), with again an infinite number of them lying just below $\omega_c(\epsilon_{low})$.

An important lesson is that the index-guiding mechanism rigorously relates to appropriate effective and not actual material indices. In all-dielectric structures the two follow the same trend, but this is not the case always in the presence of metals, allowing for the design of Surface-Plasmon Effective-Index-Guiding (SPEIG) waveguides, like the ones above. The previous analysis also indicates how the effective-index method can be used to intuitively predict the guided modes of any given waveguide structure. First of all, the slicing of the waveguide cross-section must be chosen appropriately, so that each slice includes all the important physics of the structure (for example here the presence of SP modes). Furthermore, the correct way to interpret the concept that the dispersion line of a mode lies above or below another is to compare their wavenumber k values (or equivalently their effective indices $n_{eff} = k/(\omega/c)$) at a fixed frequency ω and not the other way round, so the terms left and right respectively would be more appropriate. Guided modes can then exist for frequencies at which there is a confined mode for an inner section of the waveguide whose dispersion curve lies to the right of all the curves corresponding to modes supported in the outermost regions of the waveguide cross-section in all directions (both laterally and vertically).

The new class of SPEIG waveguides presented here has the same great features of SPIG waveguides, which could greatly impact the field of nanophotonics. At the very high k-values close to $\omega_c$ the characteristic longitudinal length and the transverse modal profile have sizes on the order of an nm, leading to very high device compactness. The fact that the group velocity can become arbitrarily small by decreasing the core thickness is a very important attribute that can be used to significantly enhance non-linear phenomena or gain in active devices, and thus to reduce their required operational power down to nW (see the paper to Soljacic et al. titled "Enhancement of Non-Linear Effects Using Photonic Crystals"). Furthermore, the amazing feature of very small group velocity over a large bandwidth and with small group velocity dispersion implies that these waveguides can slow down ultrashort ƒ sec pulses without introducing distortion to them, thereby allowing for exciting promises in the field of ultrafast optics. An issue arising though is whether light could be efficiently coupled into or out of these waveguides over this entire large bandwidth. This should be feasible, since by tapering down the size of the waveguide core its modal dispersion curve can be brought into broadband alignment with that of a regular waveguide mode, and this is the key requirement for all coupling mechanisms.

The most important concern relating to the feasibility of surface plasmon optics is that metallic structures exhibit high losses at optical wavelengths. The intrinsic loss of conducting materials stems from inelastic scattering mechanisms, namely the predominant electron-phonon scattering, which can only be suppressed by cooling, and electron-electron scattering, which is negligible compared to the first at room temperatures. Additional loss mechanisms are those due to elastic scattering, as from impurities or imperfections of the crystal, dictating the need for very clean samples, and from the crystal boundaries, which can be very important if the geometry of the conductor has features of length scale smaller than the mean free path ($l \approx 3$ μm at T=300° K. for copper) (see the paper to Economou titled "Surface Plasmons in Thin Films" and the publication to Kittel titled "Introduction to Solid State Physics"). Here lies the superiority of the currently presented plasmonic waveguide design that involves only a large bulk and completely unpatterned metallic substrate, limiting the loss only to its intrinsic part, which can be decreased by lowering temperature. Electrons in thin films or surface-corrugated metals, on the other hand, will necessarily suffer significant boundary scattering and thus their surface plasmon modes are expected to have much smaller propagation lengths. By using again the Drude model $\epsilon_p(\omega)=1-\omega_p^2/(\omega^2+i\gamma\omega)$ to account for losses, an estimate for the planarly layered structures of FIG. 1 showed that their propagation characteristics stay intact up to large k-values, while absorption loss in-creases as group velocity decreases and temperature in-creases. Specifically, for copper ($\omega_p \approx 5 \cdot 10^{15}$ rad/sec) at the frequency where the group velocity reaches $\approx 0.1c$ the loss is $\approx 5.8$ dB/μm at room temperature (T=300° K.$\Rightarrow \gamma \approx 5 \cdot 10^{13}$ rad/sec) and much lower $\approx 0.58$ dB/cm at liquid He temperature (T=4° K.$\Rightarrow \gamma \approx 5 \cdot 10^{8}$ rad/sec), while for $\approx 0.01c$ these numbers are $\approx 72$ dB/μm and $\approx 7.2$ dB/cm for the two temperatures respectively.

Hence, as per the present invention, a novel class of surface-plasmon waveguides, built on the surface of a flat large plasmonic substrate is presented. These novel waveguides can support very slow light over their large bandwidth of operation, becoming good candidates for devices with subwavelength size, and ultrashort pulse and extralow-energy (enabled by low group velocity, and small modal areas) operation. They exhibit low absorption loss and allow for easy coupling by tapering. Given appropriate material choice, they can be used in a wide variety of different frequency regimes.

It should be noted that by implementing axial optical modulation (say by modifying index of refraction of the dielectric of the waveguide in the axial direction periodically) of the waveguides above, one can implement a microcavity of extraordinarily small modal volume, which could also be very useful for many important applications.

It should also be noted that the principles described above could also be implemented in a cylindrical geometry of an optical fiber. For example, imagine an azimuthally uniform photonic crystal fiber that consists of many different layers in the radial direction. One of the layers can be made metallic thereby enabling existence of a surface plasmon mode; by adjusting the properties of the neighboring dielectric layers, we can implement the principles described above.

Another embodiment would be to use materials that support polaritonic materials (instead of metals, or other materials) to provide for the needed negative epsilon and strong material dispersion which enabled the designs described above. Although losses for most polaritonic materials have not been measured experimentally, it is believed that even at room temperature levels of $\text{Im}\{\epsilon\}<0.1$ and large negative $\text{Re}\{\epsilon\}$ can be achieved. The losses, which are also due to electron-phonon scattering, are similarly reduced by lowering the temperature.

In general, the waveguides presented above can be used with any negative $\text{Re}\{\epsilon\}$ material, although materials that work best would also have strong dispersion. Plasmonic dispersion relation $\text{Re}\{\epsilon(\omega)\}=1-(\omega_p/\omega)^2$ are particularly useful. Examples of such materials include: metals (particularly useful for applications with frequencies in near-UV, visible, and near-infrared), polaritonic materials (e.g. phonon-polariton, excition-polariton, which are particularly useful for applications in THz regime), and highly doped semiconductors (for application across a wide range of frequencies, even reaching into GHz regime).

CONCLUSION

A system and method has been shown in the above embodiments for the effective implementation of surface-plasmon index guided (SPIG) waveguides and surface-plasmon effective index guided (SPEIG) waveguides. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. An apparatus comprising:
   a flat unpatterned substrate of plasmonic material; and
   a distribution of different dielectric regions disposed on top of said flat unpatterned substrate of plasmonic material forming a waveguide and a plurality of guided surface plasmon modes existing for a specific frequency regime, said surface plasmon modes supported on an interface between said substrate and said different dielectric regions,
   wherein said plasmonic material and said surface plasmon modes existent in said different dielectric regions have different dispersion relations allowing frequency bands in which surface plasmon in a central waveguiding region within said different dielectric region, due to its large wavevector, couples only to evanescent surface plasmon modes in regions outside said waveguiding region, and is thereby being guided.

2. An apparatus as per claim 1, wherein lowering temperature of said flat unpatterned substrate limits absorption losses to intrinsic losses.

3. An apparatus as per claim 2, wherein said absorption losses are limited to the range of $\alpha<1$, 10, $10^2$, $10^3$, $10^4$ dB/cm.

4. An apparatus as per claim 1, wherein said plasmonic material is any of the following: metal, polaritonic material, or highly doped semiconductor.

5. An apparatus as per claim 1, wherein said frequency regime is any of the following: GHz, THz, infrared, or optical.

6. An apparatus as per claim 1, wherein said dielectric region includes layered dielectric structures.

7. An apparatus as per claim 6, wherein said layered dielectric structures comprises a plurality of layers parallel to said plasmonic material.

8. An apparatus as per claim 7, where dimensions and indices of refraction of the layered structure are chosen to support at least one frequency regime of negative group velocity.

9. An apparatus as per claim 7, where dimensions and indices of refraction of the layered structure are chosen to support at least one frequency point of zero group velocity at non-zero wavevector.

10. An apparatus as per claim 7, where the dimensions and indices of refraction of the layered structure are chosen to support regimes of low absolute value of the positive or negative group velocity and large wavevectors over large frequency bandwidths.

11. An apparatus as per claim 10, wherein said large frequency bandwidth is defined by $\Delta\omega/\omega>0.01$, 0.05, 0.1, 0.2, 0.5, said low group velocity is defined by $|v_G/c|<0.1$, 0.01, 0.001, and said large wavevector is defined by $k^*\lambda_{AIR}/(2\pi)>2$, 5, 10, 25.

12. An apparatus comprising:
a flat unpatterned substrate of plasmonic material; and
a distribution of different dielectric regions disposed on top of said flat unpatterned substrate of plasmonic material forming a waveguide, and a plurality of guided surface plasmon modes existing for a specific frequency regime, said surface plasmon modes supported on an interface between said substrate and said different dielectric regions,
wherein surface plasmon modes existent in said different dielectric regions have different frequency cutoffs allowing frequency bands in which a surface plasmon in a central waveguiding region within said different dielectric regions has frequency which is above the frequency cutoff for the surface plasmon modes in regions outside said central waveguiding region, whereby the surface plasmon in the central waveguiding region has no surface plasmons outside said central waveguiding region to which it can couple to, and is thereby being guided.

13. An apparatus as per claim 12, wherein lowering temperature of said flat unpatterned substrate limits absorption losses to intrinsic losses.

14. An apparatus as per claim 13, wherein said absorption losses are limited to the range of $\alpha<1$, 10, $10^2$, $10^3$, $10^4$ dB/cm.

15. An apparatus as per claim 12, wherein said plasmonic material is any of the following: metal, polaritonic material, or highly doped semiconductor.

16. An apparatus as per claim 12, wherein said frequency regime is any of the following: GHz, THz, infrared, or optical.

17. An apparatus as per claim 12, wherein said dielectric region includes layered dielectric structures.

18. An apparatus as per claim 17, wherein said layered dielectric structures comprises a plurality of layers parallel to said plasmonic material.

19. An apparatus as per claim 17, where dimensions and indices of refraction of the layered structure are chosen to support at least one frequency regime of negative group velocity.

20. An apparatus as per claim 17, where dimensions and indices of refraction of the layered structure are chosen to support at least one frequency point of zero group velocity at non-zero wavevector.

21. An apparatus as per claim 17, where the dimensions and indices of refraction of the layered structure are chosen to support regimes of low absolute value of the positive or negative group velocity and large wavevectors over large frequency bandwidths.

22. An apparatus as per claim 21, wherein said large frequency bandwidth is defined by $\Delta\omega/\omega>0.01$, 0.05, 0.1, 0.2, 0.5, said low group velocity is defined by $|v_G/c|<0.1$, 0.01, 0.001, and said large wavevector is defined by $k^*\lambda_{AIR}/(2\pi)>2$, 5, 10, 25.

* * * * *